J. R. GAMMETER & J. BOURGUIGNON.
STAY FASTENER FOR BALLOONS.
APPLICATION FILED OCT. 16, 1918.

1,292,596.

Patented Jan. 28, 1919.

Inventors
John R. Gammeter
Jules Bourguignon
By Robert M. Pierson
Atty.

UNITED STATES PATENT OFFICE.

JOHN R. GAMMETER, OF AKRON, OHIO, AND JULES BOURGUIGNON, OF BILLANCOURT, FRANCE, ASSIGNORS TO THE B. F. GOODRICH COMPANY, OF NEW YORK, N. Y., A CORPORATION OF NEW YORK.

STAY-FASTENER FOR BALLOONS.

1,292,596.            Specification of Letters Patent.      Patented Jan. 28, 1919.

Application filed October 16, 1918. Serial No. 258,481.

*To all whom it may concern:*

Be it known that we, JOHN R. GAMMETER, a citizen of the United States, residing at Akron, in the county of Summit and State of Ohio, and JULES BOURGUIGNON, a citizen of France, and resident of Billancourt, in the Department of Seine, France, have invented a certain new and useful Stay-Fastener for Balloons, of which the following is a specification.

This invention relates to fasteners adapted to be employed in place of the usual splay patches on the envelop of a balloon for securing the ends of cables or stays to the bag. Our object is to provide a form of fastening which will not wrinkle the envelop, will permit the expansion of the latter, and will allow for a certain amount of slip or movement of the cable in the fastener, and thus adequately distribute the strain in different angular positions of the cable.

Of the accompanying drawings.

Figure 1:
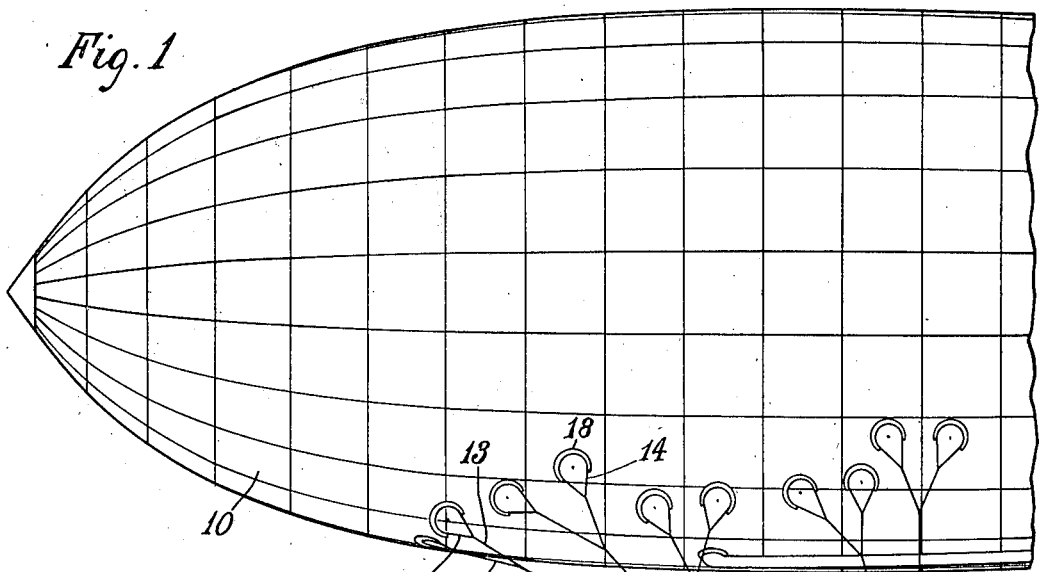
Figure 1 is a side elevation of one end of a dirigible balloon provided with our improvement.
Figure 2:
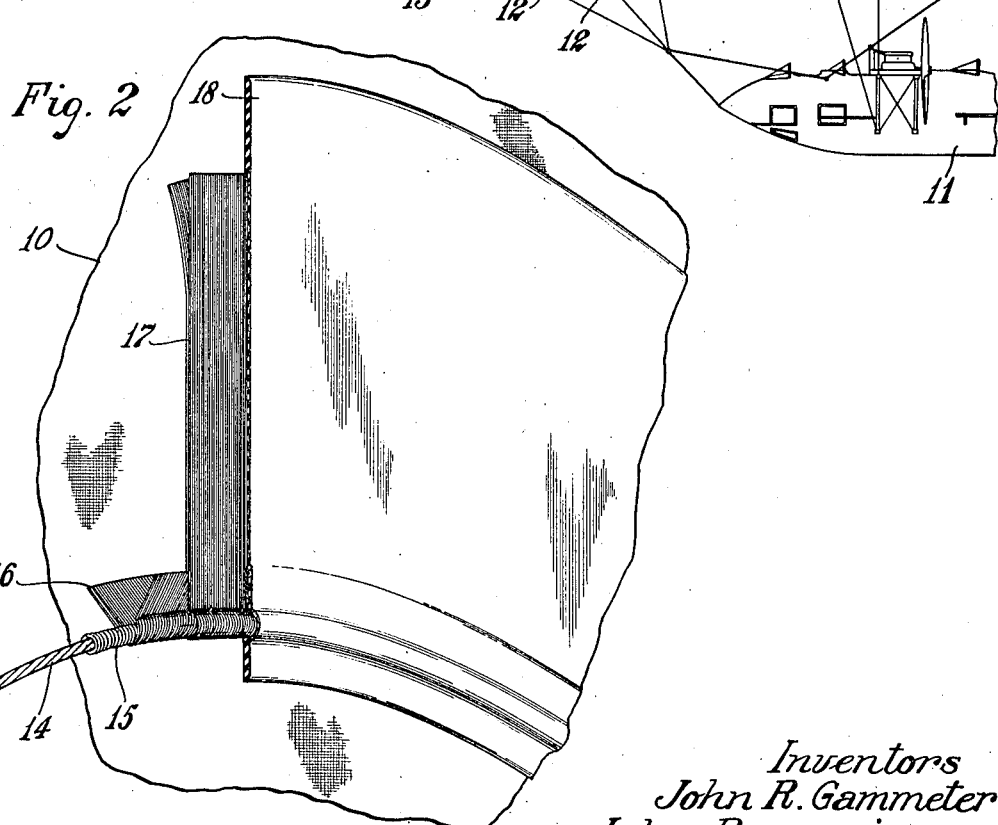
Fig. 2 is a detail elevation of a part of one of the fasteners dissected to show the interior construction.

In the drawings, 10 is the gas bag or envelop, 11 is the car or fuselage, and 12, 12 are suspending cables, preferably of twisted wire, each terminating at its upper end in a pair of branches 13 formed with terminal loops 14.

Through an arc of slightly more than a semi-circle whose open end is substantially bisected by the projected line of one of the cable branches 13, the wire loop 14 is incased in a helical wire tube or sheath 15 through which it is able to slip longitudinally or circumferentially to accommodate the slightly-varying angular positions of the cables and their branches. For securing this wire tube to the envelop 10, the said tube is inclosed in the fold of a doubled strip of fabric 16, preferably consisting of what is known as Palmer bicycle tire fabric composed of parallel warp threads connected only by vulcanized rubber. This strip is cut on the bias so that the threads in the two plies will cross each other at an angle, and the threads in neither ply will fall between the interstices of the threads in the other ply. This strip of fabric is readily conformable to the circular arc of the wire loop 15, and its weftless character, as well as the longitudinal expansibility of the helical wire tube 15, permit these elements to expand or contract in conformity with the envelop 10. The strip 16 is inclosed in the fold of a wider doubled strip 17 of similar rubberized thread fabric cut straight across the threads and vulcanized upon the inner face of a substantially crescent-shaped ply or sheet of soft rubber 18, the members 17 and 18 being also adapted to expand and contract circumferentially with the envelop. This structure is secured to the envelop in any suitable manner, but preferably by means of rubber cement, the relatively-broad area of the inner surface of the members causing the cement to produce ample adhesion without the necessity of using stitches.

This construction we have found superior to the fingered or splay patches in common use. The details of construction may be varied without departing from our invention.

We claim:

1. The combination of a balloon envelop, a cable, and a cable attachment comprising a wire loop on the end of the cable, a helical wire sheath slidingly inclosing an arc of said loop, and means for securing said sheath to the envelop.

2. The combination of a balloon envelop, a cable, and a cable attachment comprising a wire loop on the end of the cable, a circumferentially-expansible sheath slidingly inclosing an arc of said loop, and means including a circumferentially-expansible fabric member for securing said sheath to the envelop.

3. The combination of a balloon envelop, a cable, and a cable attachment comprising a wire loop on the end of the cable, a helical wire sheath slidingly inclosing an arc of said loop and inclosed in the fold of a doubled strip of rubberized fabric expansible circumferentially of the loop, said fabric being attached to the envelop.

4. The combination of a balloon envelop, a cable, and a cable attachment comprising a wire loop on the end of the cable, a helical wire sheath slidingly inclosing an arc of said loop, a doubled strip of weftless, rubberized, thread fabric inclosing said sheath in its fold and having its threads directed transversely of the loop, and a substantially crescent-shaped soft-rubber member overlying and attached to said strip and cemented to the envelop.

5. The combination of a balloon envelop, a cable, and a cable attachment comprising a wire loop on the end of the cable, a helical wire sheath slidingly inclosing an arc of said loop, a bias-cut doubled strip of rubberized thread fabric infolding said sheath, a wider straight-cut doubled strip of rubberized thread fabric infolding the first-said strip, and a covering ply of soft rubber vulcanized to the outer side of the said wider fabric strip and cemented to the envelop.

6. An article of manufacture comprising an arcuate, helical, wire tube, and a relatively-broad member secured thereto for attaching the same to a surface such as that of a balloon envelop.

7. An article of manufacture comprising an arcuate, helical, wire tube, and a relatively-broad attaching device for securing the same to a surface such as that of a balloon envelop, said device including a doubled strip of fabric infolding said tube and a relatively-broad ply of soft rubber vulcanized to said fabric strip.

In testimony whereof we have hereunto set our hands this 10 day of October 1918.

JOHN R. GAMMETER.
JULES BOURGUIGNON.